United States Patent
Luo et al.

(10) Patent No.: US 11,853,150 B2
(45) Date of Patent: Dec. 26, 2023

(54) METHOD AND DEVICE FOR DETECTING MEMORY DOWNGRADE ERROR

(71) Applicant: Inspur Suzhou Intelligent Technology Co., Ltd., Suzhou (CN)

(72) Inventors: Pengfang Luo, Suzhou (CN); Leijun Hu, Suzhou (CN)

(73) Assignee: Inspur Suzhou Intelligent Technology Co., Ltd., Suzhou (CN)

(*) Notice: Subject to any disclaimer, the term of this patent is extended or adjusted under 35 U.S.C. 154(b) by 0 days.

(21) Appl. No.: 17/762,213

(22) PCT Filed: Dec. 30, 2019

(86) PCT No.: PCT/CN2019/129991
§ 371 (c)(1),
(2) Date: Mar. 21, 2022

(87) PCT Pub. No.: WO2021/056912
PCT Pub. Date: Apr. 1, 2021

(65) Prior Publication Data
US 2022/0342740 A1    Oct. 27, 2022

(30) Foreign Application Priority Data
Sep. 29, 2019  (CN) .......................... 201910932646.6

(51) Int. Cl.
*G06F 11/07* (2006.01)

(52) U.S. Cl.
CPC .......... *G06F 11/079* (2013.01); *G06F 11/073* (2013.01)

(58) Field of Classification Search
CPC .............................. G06F 11/079; G06F 11/073
See application file for complete search history.

(56) References Cited

U.S. PATENT DOCUMENTS

| | | | |
|---|---|---|---|
| 9,864,603 B2* | 1/2018 | Raj | ..................... G06F 9/3861 |
| 10,268,541 B2 | 4/2019 | Niu | |
| 2018/0157525 A1 | 6/2018 | Song | |
| 2019/0179705 A1 | 6/2019 | Niu | |
| 2021/0389956 A1 | 12/2021 | Li | |

FOREIGN PATENT DOCUMENTS

| CN | 102681909 A | 9/2012 |
|---|---|---|
| CN | 102799506 A | 11/2012 |
| CN | 103905253 A | 7/2014 |

(Continued)

OTHER PUBLICATIONS

Search Report and Written Opinion, PCT/CN2019/129991, dated Dec. 30, 2019.

(Continued)

*Primary Examiner* — Nadeem Iqbal
(74) *Attorney, Agent, or Firm* — David R. Stevens; Stevens Law Group

(57) ABSTRACT

A method and device for detecting a memory downgrade error. The method comprises: capturing and analyzing a memory error by means of an operating system (OS); sending a memory downgrade error log to a management chip BMC on a server motherboard according to the analysis result; and after the BMC receives log information, detecting and locating an uncorrectable memory inspection error on the basis of an algorithm.

4 Claims, 2 Drawing Sheets

(56) References Cited

FOREIGN PATENT DOCUMENTS

| | | |
|---|---|---|
| CN | 105786668 A | 7/2016 |
| CN | 105893166 A | 8/2016 |
| CN | 106445720 A | 2/2017 |
| CN | 107077408 A | 8/2017 |
| CN | 108108259 A | 6/2018 |
| CN | 110046061 A | 7/2019 |

OTHER PUBLICATIONS

First Office Action, CN201910932646.6, dated Oct. 28, 2020.
Second Office Action, CN201910932646.6, dated Jun. 22, 2021.
Third Office Action, CN201910932646.6, dated Dec. 20, 2021.

* cited by examiner

METHOD AND DEVICE FOR DETECTING MEMORY DOWNGRADE ERROR

CROSS REFERENCE TO RELATED APPLICATIONS

This application claims priority to China Patent Application No. 201910932646.6, filed on Sep. 29, 2019 in China National Intellectual Property Administration and entitled "METHOD AND DEVICE FOR DETECTING MEMORY DOWNGRADE ERROR", which is hereby incorporated by reference in its entirety.

TECHNICAL FIELD

The present invention relates to a memory technology, in particular to a method and device for detecting a memory downgrade error.

BACKGROUND

In the prior art, with the development of the Internet era in recent years, the demand for a massive data processing capability is growing rapidly, which puts forward higher requirements on servers. As an original driving force of the server industry, the application of an advanced technology will play a decisive role in user's procurement. In today's rapid development of network technologies, virtualization technologies and distributed application, servers require increasing higher indicators for availability, reliability and serviceability. Financial services and telecommunication services have become indispensable elements for economic and social life anytime and anywhere. The normal operations of financial and telecommunication services are highly dependent on the continuous and stable operation of an information system, and extremely high requirements are also put forward on the availability of high-end servers. The availability of a high-end server system is required to be up to 99.999%.

During the operation of each business, a server also has a large amount of memory data to be accessed. Generally, Intel hardware has its own error correction function. When a correctable memory error occurs in a memory access, the hardware can correct the error, but a server product needs to obtain correctable memory error information by means of monitoring. The robustness of the product is provided to a customer, a user can be timely informed of replacing a memory with a high error frequency, and a better customer experience can be provided.

A mainstream product, i.e., an Intel x86 general-purpose server, in the prior art supports an enhanced machine check architecture generation 2 (EMCA2) function. According to the Intel design, when the EMCA2 function is enabled, system management interrupt (SMI) is triggered every time a single bank in a memory detects a correctable memory error. When a certain fixed position of a single memory keeps reporting errors, an SMI storm is easily triggered, which causes machine downtime. At present, a method for shutting off the SMI is adopted, by means of triggering correctable machine check interrupt (CMCI), an operating system (OS) processes the correctable memory error, and the error is recorded in an in-band system.

By the solution in the prior art, the risk of downtime caused by the SMI can be suppressed. However, since a basic input output system (BIOS) cannot process the error by means of the SMI and cannot send the error to a baseboard management controller (BMC) on a server motherboard, only when the error reaches a threshold, is the SMI triggered for error processing, which causes an out-of-band system to fail in detecting a memory downgrade error of a machine check bank (MC bank) corresponding to the memory. Some key errors cannot be recorded in the out-of-band system. The memory downgrade error is that downtime is caused by an uncorrectable error detected by a memory inspection engine, and the current measure is to degrade the error to be a correctable error. However, the BIOS cannot detect such an error and cannot send the error to the out-of-band system. If the error is not processed, the error will be covered by a next correctable error, resulting in a reporting failure of the error to bring great inconvenience to customers who rely on the out-of-band system to diagnose system errors.

SUMMARY

In order to solve the above-mentioned technical problems, embodiments of the present invention provide a method and device for detecting a memory downgrade error, wherein by means of a method of intercepting and parsing a memory error by means of an operating system and sending a memory downgrade error log to a BMC, the problem that a memory downgrade error cannot be monitored out of band in the case that SMI is disabled after EMCA2 is enabled is solved.

In order to achieve the objective of the present invention, in one aspect, an embodiment of the present invention provides a method for detecting a memory downgrade error, including:
  intercepting and parsing a memory error by means of an operating system;
  sending a memory downgrade error log to a BMC on a server motherboard according to a parsing result; and
  detecting and locating an uncorrectable memory inspection error according to an algorithm after the BMC receives log information.

Further, before intercepting and parsing the memory error by means of the operating system, the method includes:
  adding a program for processing a memory downgrade error in a correctable machine check interrupt (CMCI) code in a kernel of the operating system; and
  starting an EMCA2 in a BIOS code, and setting an error generation interrupt type related to a memory to be CMCI.

Further, the intercepting and parsing the memory error by means of the operating system includes:
  setting a memory error of a central processing unit (CPU) to be that the CMCI is triggered every time a correctable error occurs, wherein processing is performed by the CMCI of the operating system.

Further, the intercepting and parsing the memory error by means of the operating system includes:
  performing data parsing on an MC bank during the processing of the CMCI; acquiring a specific fault memory address and an error type by means of the MC bank each time the operating system receives the CMCI after the operating system of a machine is boosted; and sending the log information to the BMC if the error type is a degradation error.

Further, detecting and locating the uncorrectable memory inspection error according to the algorithm after the BMC receives log information includes:
  obtaining a memory bank position by means of a memory conversion algorithm according to a memory address after the BMC receives the log information.

In another aspect, an embodiment of the present invention provides an device for detecting a memory downgrade error, including:
a parsing module, configured to intercept and parse a memory error by means of an operating system;
a sending module, configured to send a memory downgrade error log to a BMC on a server motherboard according to a parsing result; and
a locating module, configured to, after the BMC receives log information, detect and locate an uncorrectable memory inspection error according to an algorithm.

Further, the device further includes a setting module, configured to:
add a program for processing a memory downgrade error in a CMCI code in a kernel of the operating system;
start an EMCA2 in a BIOS code, and set an error generation interrupt type related to a memory to be CMCI.

Further, the parsing module is configured to:
set a memory error of a CPU to be that the CMCI once every time a correctable error occurs, wherein processing is performed by the CMCI of the operating system.

Further, the parsing module is configured to:
perform data parsing on an MC bank during the processing of the CMCI; acquire a specific fault memory address and an error type by means of the MC bank each time the operating system receives the CMCI after the operating system of a machine is boosted; and send the log information to the BMC if the error type is a degradation error.

Further, the locating module is configured to:
obtain a memory bank position by means of a memory conversion algorithm according to a memory address after the BMC receives the log information.

In the embodiments of the present invention, the memory error is intercepted and parsed by means of the operating system, the memory downgrade error log is sent to the BMC on the server motherboard according to the parsing result, and after the BMC receives the log information, the uncorrectable memory inspection error is detected and located according to the algorithm. According to the embodiments of the present invention, by means of the method of intercepting and parsing the memory error by means of the operating system and sending the memory downgrade error log to the BMC, the problem that the memory downgrade error cannot be monitored out of band when the SMI is disabled after the EMCA2 is enabled.

Other features and advantages of the present invention will be illustrated in the following description, and partly become obvious in the description, or are understood by implementing the present invention. The objectives and other advantages of the present invention can be realized and obtained by means of the structures specifically pointed out in the description, claims and drawings.

BRIEF DESCRIPTION OF THE DRAWINGS

The accompanying drawings are used to provide a further understanding of the technical solutions of the present invention, constitute a part of the specification, and are used to explain the technical solutions of the present invention together with the embodiments of the present application, but do not constitute a limitation to the technical solutions of the present invention.

DETAILED DESCRIPTION

In order to make the objectives, the technical solutions, and the advantages of the present invention clearer, the embodiments of the present invention will be described in detail in combination with the accompanying drawing hereinafter. It should be noted that the embodiments of the present application and features in the embodiments may be randomly combined with each other without conflicts.

The steps shown in the flowchart of the figure may be executed in a computer system with a group of computer-executable instructions, for example. Furthermore, a logic order is shown in the flowchart, but in some cases, the steps shown or described can be executed in an order different from this order.

Figure 1:
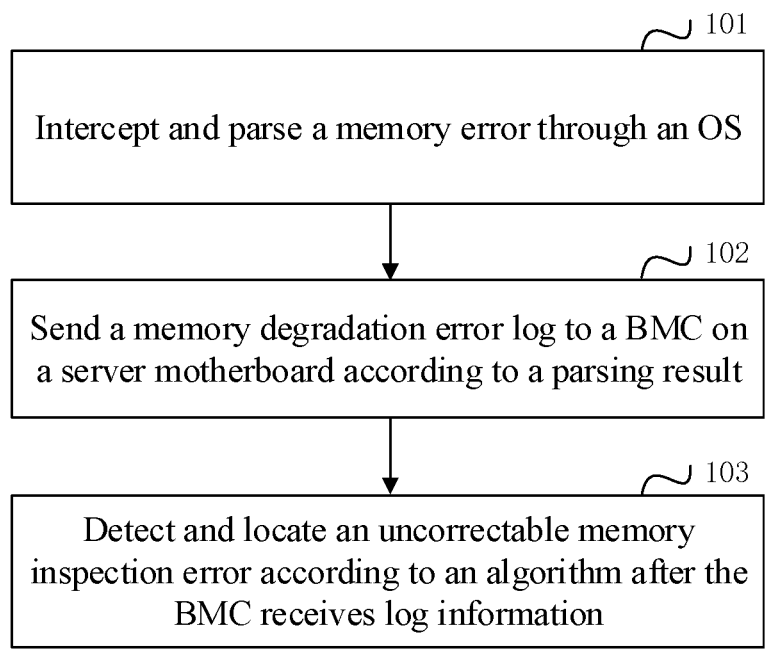
FIG. 1 is a flowchart of a method for detecting a memory downgrade error according to an embodiment of the present invention.

FIG. 1 is a flowchart of a method for detecting a memory downgrade error according to an embodiment of the present invention. As shown in FIG. 1, the method according to the embodiment of the present invention includes the following steps.

Step 101: a memory error is intercepted and parsed by means of an operating system.

Specifically, the embodiment of the present invention provides a method for intercepting and parsing the memory error by means of the operating system and sending a memory downgrade error log to a BMC on a server motherboard, so that the problem that a memory downgrade error cannot be monitored out of band when SMI is disabled after EMCA2 is enabled is solved.

The EMCA2 is enhanced machine check architecture generation 2.

Step 102: a memory downgrade error log is sent to a BMC on a server motherboard according to a parsing result.

For example, if a memory downgrade error is detected, a command is sent to the BMC by means of an intelligent platform management interface (IPMI) driver.

Step 103: after the BMC receives log information, an uncorrectable memory inspection error is detected and located according to an algorithm.

For example, a memory bank position may be obtained by means of a memory conversion algorithm according to a memory address.

Further, before the memory error is intercepted and parsed by means of the OS, the method includes that
a program for processing the memory downgrade error is added in a CMCI code in a kernel of the operating system.

CMCI is correctable machine check interrupt.

The EMCA2 is started in a BIOS code, and an error generation interrupt type related to a memory is set to be the CMCI.

Further, the step that the memory error is intercepted and parsed by means of the operating system includes that
a memory error of a CPU is set to be that the CMCI is triggered every time a correctable error occurs, wherein processing is performed by the CMCI of the operating system.

Further, the step that the memory error is intercepted and parsed by means of the operating system includes that
data parsing is performed on an MC bank during the processing of the CMCI; after the operating system of a machine is boosted, a specific fault memory address and an error type are obtained by means of the MC bank each time the operating system receives the CMCI; and if the error type is a degradation error, the log information is sent to the BMC.

The MC bank is machine check bank.

Further, the step that after the BMC receives the log information, the uncorrectable memory inspection error is detected and located according to the algorithm includes that after the BMC receives the log information, a memory bank position is obtained by means of a memory conversion algorithm according to a memory address.

An implementation process of the technical solution of the embodiment of the present invention is described in detail below:

in the process of developing server hardware, the memory error of the CPU is set to be that the CMCI, instead of the SMI, is triggered every time the correctable error occurs, which can reduce the risk of downtime. Processing is performed by the CMCI of the operating system, during the processing of the CMCI, the data parsing is performed on the MC bank. If the memory downgrade error is detected, the command is sent to the BMC by means of the IPMI driver, and the BMC records the memory error information and displays the information to a system error log, so that a user can reserve a machine according to warning information and contact an after-sales service worker to replace a fault memory.

The following specific steps are included.

A function for processing the memory downgrade error is added in the CMCI code in the kernel of the operating system;

the EMCA2 is started in the BIOS code, and the error generation interrupt type related to the memory is set to be the CMCI;

after the operating system of the machine is boosted, a specific fault memory address and an error type by means of the MC bank are obtained every time the operating system receives the CMCI; if the error type is the degradation error, the log information is sent to the BMC; if the error type is not the memory downgrade error, no log is sent; and after the BMC receives the log information, the log information may be displayed in a log list, and at the same time, the log information may be analyzed to obtain more detailed fault analysis; the memory bank position is obtained by means of the memory conversion algorithm according to the memory address; and the uncorrectable memory inspection error is located.

According to the technical solution of the embodiment of the present invention, when the EMCA2 function is started, the operating system processes each correctable memory error; the determination of the error type is performed during the processing of the CMCI; an uncorrectable error is degraded to be a correctable error and is timely located, instead of being processed by the SMI. On the one hand, SMI storm can be avoided, and meanwhile, it can be ensured that the BMC system can monitor a health status of the memory. The diagnosable ability, the serviceability, and the like of the system can be improved. At the same time, logs are recorded to provide out-of-band visualized readable information for the user, an operation status of a server is mastered conveniently, and a fault memory of the server can be timely located and replaced.

The embodiment of the present invention mainly achieves processing the correctable memory error in the case that the SMI is shut off under the EMCA2 mode, wherein the determination of the error type is performed during the processing of the CMCI, and fault information is transmitted to the BMC, the uncorrectable error is degraded to be the correctable error and is located timely, so as to avoid a reporting failure.

Figure 2:
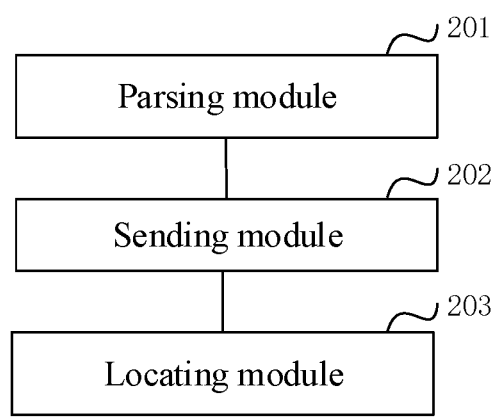
FIG. 2 is a structural diagram of an device for detecting a memory downgrade error according to an embodiment of the present invention.

FIG. 2 is a structural diagram of an device for detecting a memory downgrade error according to an embodiment of the present invention. As shown in FIG. 2, an device for detecting a memory downgrade error provided in another aspect of the embodiment of the present invention includes:

a parsing module 201, configured to intercept and parse a memory error by means of an operating system;

a sending module 202, configured to send a memory downgrade error log to a BMC on a server motherboard according to a parsing result; and a locating module 203, configured to, after the BMC receives log information, detect and locate an uncorrectable memory inspection error according to an algorithm.

Further, the device further includes a setting module, configured to:

add a program for processing a memory downgrade error in a CMCI code in a kernel of the operating system; and start an EMCA2 in a BIOS code, and set an error generation interrupt type related to a memory to be CMCI.

Further, the parsing module 201 is configured to:

set a memory error of a CPU to be that the CMCI is triggered every time a correctable error occurs, wherein processing is performed by the CMCI of the operating system.

Further, the parsing module 201 is configured to:

perform data parsing on an MC bank during the processing of the CMCI; obtain a specific fault memory address and an error type by means of the MC bank each time the operating system receives the CMCI after the operating system of a machine is boosted; and send the log information to the BMC if the error type is a degradation error.

Further, the locating module 203 is configured to:

obtain a memory bank position by means of a memory conversion algorithm according to a memory address after the BMC receives the log information.

In conclusion, in the embodiments of the present invention, the memory error is intercepted and parsed by means of the operating system, the memory downgrade error log is sent to the BMC on the server motherboard according to the parsing result, and after the BMC receives the log information, the uncorrectable memory inspection error is detected and located according to the algorithm. According to the embodiment of the present invention, by means of the method of intercepting and parsing the memory error by means of the operating system and sending the memory downgrade error log to the BMC, the problem that the memory downgrade error cannot be monitored out of band when the SMI is disabled after the EMCA2 is enabled.

Further, the technical solutions of the embodiments of the present invention are used for helping a server system to improve the fault diagnosis capability and can be applied to a firmware reliability fault diagnosis function for productization of all computer systems.

Although the implementation modes disclosed in the present invention are as described above, the content described is about an implementation mode adopted to only facilitate the understanding of the present invention, and is not intended to limit the present invention. Technicians in the art of the present invention can make any modifications and changes to the form and details of the implementation without departing from the spirit and scope of the present invention. However, the patent protection scope of the present invention shall be based on the scope defined by the appended claims.

What is claimed is:

1. A method for detecting a memory downgrade error, comprising:
    setting a memory error of a central processing unit (CPU) to be such that a correctable machine check interrupt (CMCI) is triggered every time a correctable error occurs, wherein intercepting and parsing a memory error is performed by the CMCI of an operating system (OS), when a system management interrupt (SMI) of the OS is disabled;
    sending a memory downgrade error log to a baseboard management controller (BMC) on a server motherboard according to a parsing result; and
    detecting and locating an uncorrectable memory inspection error according to a memory conversion algorithm after the BMC receives log information.

2. The method for detecting the memory downgrade error according to claim 1, wherein, before intercepting and parsing the memory error by means of the operating system, the method comprises:
    adding a function for processing a memory downgrade error in a correctable machine check interrupt (CMCI) code in a kernel of the operating system; and
    starting an enhanced machine check architecture generation 2 (EMCA2) in a basic input output system (BIOS) code, and setting an error generation interrupt type related to a memory to be CMCI.

3. The method for detecting the memory downgrade error according to claim 1, wherein, the intercepting and parsing the memory error by means of the operating system comprises:
    performing data parsing on a machine check bank (MC bank) during the processing of the CMCI; acquiring a specific fault memory address and an error type by means of the MC bank each time the operating system receives the CMCI after the operating system of a machine is boosted; and sending the log information to the BMC in the case that the error type is a degradation error.

4. The method for detecting the memory downgrade error according to claim 3, wherein, the detecting and locating the uncorrectable memory inspection error according to the algorithm after the BMC receives log information comprises:
    obtaining a memory bank position by means of a memory conversion algorithm according to a memory address after the BMC receives the log information.

* * * * *